United States Patent [19]

Engel et al.

[11] Patent Number: 5,906,847
[45] Date of Patent: May 25, 1999

[54] MILK SUBSTITUTE PREPARED WITH WHEY OR WHEY AND ADDED LACTOSE

[75] Inventors: Hans Engel, Einigen; Martinas Kuslys, Grosshoechstetten; Heinz Wyss, Oberdiessbach, all of Switzerland

[73] Assignee: Nestec S.A., Vevey, Switzerland

[21] Appl. No.: 08/936,034

[22] Filed: Sep. 23, 1997

[30] Foreign Application Priority Data

Sep. 24, 1996 [EP] European Pat. Off. .............. 96202669

[51] Int. Cl.$^6$ ..................................... A23C 21/06
[52] U.S. Cl. ........................ 426/271; 426/506; 426/519; 426/522; 426/575; 426/583; 426/585; 426/588; 426/654; 426/801
[58] Field of Search ..................................... 426/575, 583, 426/585, 588, 654, 506, 519, 522, 801, 271

[56] References Cited

U.S. PATENT DOCUMENTS

| | | | |
|---|---|---|---|
| 3,201,245 | 8/1965 | Clark et al. .................................. | 99/57 |
| 4,446,164 | 5/1984 | Brog ........................................ | 426/583 |
| 4,544,559 | 10/1985 | Gil et al. ................................... | 426/72 |
| 5,039,532 | 8/1991 | Jost et al. .................................. | 426/41 |

FOREIGN PATENT DOCUMENTS 0627169  7/1994  European Pat. Off. .......... A23C 1/12

OTHER PUBLICATIONS

Fligner, et al., "The effects of compositional factors on the short–term physical stability of a concentrated infant formula", Food Hydrocolloids, vol. 4, No. 2, pp. 95–104, 1990.

Fligner, et al., "Accelerated tests for predicting long–term creaming stability of infant formula emulsion systems", Food Hydrocolloids, vol. 5, No. 3, pp. 269–280, 1991.

Database Abstract, Derwent Information Ltd., WPI Accession No. 77–48092 y, Abstract of Japanese Patent Document No. 57 053 050 B, 1977.

*Primary Examiner*—Helen Pratt
*Attorney, Agent, or Firm*—Vogt & O'Donnell, LLP

[57] ABSTRACT

A milk substitute composition is prepared with whey solids or whey solids and added lactose by dissolving a whey solids powder in an aqueous medium containing calcium sequestering agent and carrageenate components at a temperature of approximately from 30° C. to 65° C. and then, in a second step, at the same temperature, a skimmed milk solids powder is dissolved in the whey-containing medium, and before and/or after dissolving the skimmed milk solids powder, the whey solids are allowed to soak in the aqueous liquid phase of the composition so prepared for from 10 minutes to 4 hours for hydrating the whey solids. When lactose is used, the amount of whey solids powder employed may be reduced by about half.

22 Claims, No Drawings

5,906,847

MILK SUBSTITUTE PREPARED WITH WHEY OR WHEY AND ADDED LACTOSE

BACKGROUND OF THE INVENTION

The present invention relates to milk products and particularly to preparation of milk products wherein whey is substituted for a portion of milk employed to prepare the products.

The use of whey is known in the manufacture of milk products. The advantage of using whey as a milk substitute is essentially connected with its low cost. However, the use of whey as a replacement for milk is a difficult operation. It is, in point of fact difficult to ensure that the product has thermal stability and good storage life with whey proteins.

European Patent Application Publication No. 0 627 169 concerns a process for processing milk which enables these fixed objectives to be partially achieved. Within the context of this patent application, the product to be processed may be in the form of whole milk, partially skimmed milk, skimmed milk or whey. Processing is carried out by the technique of evaporation. However, there are some disadvantages that this method does have:

Firstly, it is not suitable for obtaining milk reconstituted from milk powder. Consequently, the milk must be processed as near as possible to the milk producer and the consumer in order to reduce transport costs.

Secondly, this processing procedure does not enable sedimentation to be prevented after processing, in particular when the product is sterilized.

SUMMARY OF THE INVENTION

The milk substitute according to the present invention overcomes the disadvantages of known products. It is characterized in that it contains, by weight, approximately 10 to 12% skimmed milk solids, approximately 5 to 9% whey solids, approximately 68 to 80% water, approximately 7 to 10% fats, approximately 0.01 to 0.03% of carrageenates and approximately 0.1 to 0.3% of a calcium sequestering agent.

The process of the present invention is characterized in that in a first step, a whey solids powder is dissolved in an aqueous medium comprising carrageenate and a calcium sequestering agent at a temperature of approximately 30 to 65° C., and in a second step, at the same temperature, a skimmed milk solids powder is dissolved in the whey solution liquid phase, and the whey solids are allowed to soak for from 10 min to 4 h, it being possible for the soaking to occur before or after the skimmed milk solids powder is dissolved. Fats also may be incorporated into the milk substitute composition so-prepared, as may be lecithin. Additionally, the invention further includes process steps of heat treating, homogenizing, conditioning and sterilizing the milk substitute compositions so-prepared.

Since a product of the type of the present invention comprises a large proportion of whey proteins as a substitution/replacement for milk in a milk substitute composition, the substitution/replacement brings about a considerable reduction in raw material cost, and it also has the advantage that the substitute raw material has a milk origin.

Additionally, employment of the process with whey powder and milk powder provides a special characteristic that lies in the fact that no evaporation stage is provided for processing.

DETAILED DESCRIPTION OF THE INVENTION

In the following specification disclosure, the term "whey" includes whey or whey with added lactose, and it is possible that the whey is demineralized to a varying extent.

Although whey is present in large proportions in the milk substitute, and hence since whey proteins thereby also are present, the heat stability of the product is unexpectedly not reduced on account of this. Thus, at-high temperatures, the milk substitute reacts substantially like normal milk processed by conventional procedures from the point of view of colour, taste and consistency.

In addition, the milk substitute does not have or has few calcium ions which are capable of precipitating to form an undesirable deposit. In point of fact, free calcium ions are either well buffered by the at least partially dissociated sequestering agent, or else bound within the casein micelles. In order to ensure that calcium ions are present in a small quantity in the milk substitute, it is moreover opportune to use soft water or demineralized water in its composition.

The sequestering agent or stabilizing salt is preferably, a phosphate or citrate, for example mono-, di- or trisodium phosphate or mono-, di- or trisodium citrate or mixtures thereof.

In the process of the present invention, to prepare the milk substitute, it is preferable to use by weight, approximately 10 to 12% of skimmed milk powder, approximately 5 to 9% of whey powder, and approximately 7 to 10% fats which may be selected preferably from palm oil, coconut oil, maize oil or a combination of these. In addition, it is preferable to use approximately 0.1 to 0.3% of lecithin, approximately 0.02 to 0.03% of carrageenate, approximately 0.10 to 0.15% of sequestering agent for the solution process and approximately 0 to 0.15% sequestering agent for sterilization, and approximately 68 to 80% of soft water or preferably demineralized water.

In the process of the present invention, two variants may be employed, one using successive batches and one combining a batch stage and an in-line stage.

The variant using successive batches comprises dissolving both the whey and milk powder in a vat.

The variant combining a stage in batches and an in-line stage assumes that the whey powder is dissolved in a vat and the milk powder is dissolved in-line.

The advantage of this process is that it guarantees the temperature stability of the final product which is comparable to that of milk, in spite of the presence of large quantities of whey proteins.

Before commencing to dissolve the milk powders or whey powders, it is necessary to prepare the solubilizing aqueous medium. It comprises, by weight, approximately 68 to 80% of water, approximately 0.01 to 0.03% of carrageenate and approximately 0.1 to 0.15% of sequestering agent. The sequestering agent and the carrageenate may be incorporated in water at a temperature of 30 to 65° C., preferably at approximately 60 to 65° C., in a first vat in two ways.: One way is by circulating water through a powder distributor introducing the sequestering agent and the carrageenate, and the other way is by pre-dissolving the carrageenate and the sequestering agent separately in a small quantity of water before mixing them, with moderate stirring, with all the water to form the solubilizing aqueous medium.

Additionally two methods may be envisaged for incorporating the whey powder in the aqueous solution in the first vessel at 30 to 65° C., preferably at approximately 60 to 65° C. The solution is recirculated through a powder distributor having whey powder, or the powder is added directly to the solution and dissolved with vigorous stirring.

After dissolving the whey in the aqueous medium, it is necessary to allow the whey solution thus obtained to stand for 10 min to 4 h, preferably for 10 to 45 min at a temperature of approximately 55 to 65° C. This dwell time is necessary for enabling the whey proteins to rehydrate.

Once the rehydration of the proteins has been carried out, the skimmed milk powder may be incorporated in the whey solution. Two variants may be envisaged for ensuring good dissolution of the milk powder in the whey solution. The whey solution may be recirculated from a second vat through a powder distributor introducing milk powder, or the milk powder may be incorporated progressively in the whey solution as it circulates in-line.

According to a variant, however, it is possible to provide for the whey proteins to be rehydrated directly after the skimmed milk powder is dissolved.

Before continuing operations, a degassing phase is recommended by expansion at approximately 45 to 50° C. After degassing, it is necessary to preheat the milk solution, preferably to approximately 60° C. so as to be able to incorporate the fats, in particular vegetable oils. The vegetable oils as well as lecithin are mixed and preheated to approximately 60 to 65° C. The fatty phase is then combined with the milk solution and mixed, preferably with the aid of a static mixer or a colloid mill. In order to ensure rehydration and balancing of the solution, it is allowed to stand. The dwell period is preferably approximately 25 to 35 min, if the operation is carried out in a vat, or 15 to 20 min if the milk powder is incorporated in-line.

Following the foregoing operations, pasteurization of the solution is carried out which may take two forms. Pasteurization may be carried out indirectly for approximately 1 to 5 s at approximately 80 to 85° C., for example by means of a tubular exchanger or plate exchanger or may be carried out in a direct manner for approximately 3 to 5 s at approximately 120 to 130° C. by direct steam injection. Pasteurization is preferably followed by flash expansion at approximately 70 to 80° C.

After pasteurization, the solution is preferably subjected to homogenization in two stages which may be carried out at a temperature of approximately 70 to 75° C. in two stages. The first stage is at a pressure of approximately 190 to 210 bar and the second is at approximately 30 to 50 bar.

The temperature of the solution is advantageously lowered to approximately 4 to 8° C. A sample is taken in order to carry out sterilization tests from which the quantities of water and stabilizing salt to be added to the solution are determined. The stabilizing salt is dissolved in water in an amount of 0 to approximately 0.15% by weight and incorporated in the milk solution to ensure standardization of the said solution.

Finally, the containers intended for sale are filled with the milk substitute thus obtained, making sure that an empty space is left above the level of the liquid to enable the contents of the container to be shaken before use. Sterilization is carried out, preferably, for approximately 12 to 15 min at approximately 115 to 122° C. after having reheated the product to approximately 95 to 97° C.

EXAMPLES

The following examples illustrate the invention. In these, percentages and parts are by weight, unless indicated to the contrary.

Example 1

The process for manufacturing the milk substitute below comprised a batch-batch sequence. The milk substitute was composed of the following ingredients in the proportions indicated:

| | |
|---|---|
| 10.9% | skimmed milk powder |
| 7.2% | sweet whey powder, |
| 7.6% | non-hydrogenated palm oil, |
| 0.2% | lecithin, |
| 0.02% | carrageenate, |
| 0.24% | dehydrated disodium hydrogenphosphate (sequestering agent). |
| 73.84% | water. |

The carrageenate and 50% of the sequestering agent were dissolved in a first vat containing soft water at 65° C. by recirculating the water through a powder distributor containing the two afore-mentioned ingredients. The whey powder was dissolved in the same way by recirculating the same water to which carrageenate and sequestering agent have been added, using the same powder distributor, this time containing whey powder. In order to enable rehydration of the whey proteins to take place, it was important to allow the solution thus obtained to stand for thirty minutes at 60° C.

After having obtained a solution based on whey, the skimmed milk powder was incorporated at 55° C. in a second vat by recirculating the said solution through a powder distributer containing skimmed milk powder. After this operation, the solution was degassed at 45° C.

The following stage consisted of incorporating lecithin and palm oil in the milk solution. In order to do this, the solution was reheated to 60° C. The lecithin was mixed with palm oil and the mixture was heated to 65° C. The fat phase was then metered out and mixed with the milk solution with the aid of a static mixer. After this operation, the mixture was allowed to stand for about thirty minutes at 55° C.

Pasteurization was then carried out at 85° C. for 5 s before subjecting the milk solution to homogenization in two stages, the first at 70° C. at a pressure of 200 bar, followed by the second at 30 bar at the same temperature.

In order to test sterilization, the milk solution was cooled to 6° C. On the basis of the sterilization test, the solution was standardized to 26% of dry matter with demineralized water containing the necessary quantity of sequestering agent in the dissolved form. In order to ensure good dispersion of the sequestering agent, the solution should be well mixed before passing to the following stage.

Cartons were then filled with the milk solution in a continuous and standard manner, leaving an empty space between the liquid and the lid of the carton. After the filling stage, the product was preheated to 95° C., and then sterilized in its package at 118° C. for 15 min. The milk substitute in the carton thus obtained was ready to put on sale.

Example 2

The following example concerned a milk substitute of which the manufacturing process comprised a batch-line sequence. The milk substitute was composed of the following ingredients in the proportions indicated:

| | |
|---|---|
| 10.6% | skimmed milk powder |
| 7.2% | sweet whey powder, |
| 7.6% | coconut oil, |
| 0.8% | maize oil, |
| 0.2% | lecithin, |

| | |
|---|---|
| 0.03% | carrageenate, |
| 0.24% | dehydrated disodium hydrogenphosphate (sequestering agent). |
| 73.33% | water. |

First of all, 50% of the sequestering agent was dissolved in water, the carrageenate was pre-dissolved in cold water, and the sequestering agent and carrageenate solutions were then mixed at 65° C. in a vat with the aid of a mixer with moderate stirring.

The whey powder was incorporated in the aqueous solution previously obtained with the aid of a mixer with vigorous stirring. After having incorporated the whey powder, the whey solution was allowed to stand for about thirty minutes at a constant temperature of 60° C.

The skimmed milk powder was then dissolved in a continuous manner in-line in the stream of whey solution at 60° C. After incorporating the milk powder, the solution was allowed to stand at 50° C. to enable it to degas by expansion.

Following degassing, the coconut and maize oils, as well as the lecithin, premixed and preheated to 65° C., were mixed continuously with the milk solution obtained, using a colloid mill. The solution was circulated in the pipework for 15 min before passing to the following stage.

After adding the oil to the milk solution, direct pasteurization was carried out at 125° C. for 4 s and the milk solution was then subjected to a flash expansion.

Homogenization in two stages as well as the subsequent operations were similar to those described in Example 1.

We claim:

1. A process for preparing a milk substitute composition comprising:
    dissolving a whey solids powder in an aqueous medium comprising calcium sequestering agent and carrageenate components at a temperature of approximately from 30° C. to 65° C. to obtain a whey-containing medium having an aqueous liquid phase;
    dissolving a skimmed milk solids powder in the whey-containing medium at a temperature of approximately from 30° C. to 65° C. to obtain a milk substitute composition having an aqueous liquid phase; and
    allowing, before and/or after dissolving the skimmed milk solids powder, the whey solids to soak in the aqueous liquid phase for from 10 minutes to 4 hours for hydrating the whey solids.

2. A process according to claim 1 wherein the whey solids are allowed to soak prior to dissolving the milk solids powder.

3. A process according to claim 2 wherein the whey solids are allowed to soak for from 10 minutes to 45 minutes prior to dissolving the milk solids powder.

4. A process according to claim 1 or 2 or 3 wherein the whey solids are allowed to soak at a temperature of approximately from 55° C. to 65° C.

5. A process according to claim 1 further comprising adding a fat to the milk substitute composition to obtain a fat-containing milk substitute composition.

6. A process according to claim 5 further comprising also adding lecithin to the milk substitute composition to obtain the fat-containing milk substitute composition.

7. A process according to claim 6 further comprising, prior to adding the fat and lecithin, degassing the milk substitute composition.

8. A process according to claim 5 further comprising, prior to adding the fat, degassing the milk substitute composition.

9. A process according to claim 5 or 6 or 8 or 7 further comprising heat treating the fat-containing milk substitute composition to obtain a pasteurized composition and homogenizing the pasteurized composition.

10. A process according to claim 5 wherein the aqueous medium is prepared to comprise the sequestering agent and carrageenate components in amounts so that, by weight based upon the fat-containing milk substitute composition weight, the sequestering agent and carrageenate components are in amounts, respectively, of approximately from 0.1% to 0.3% and of approximately from 0.01% to 0.03% and wherein the aqueous medium is in an amount and the whey solids and skimmed milk solids are dissolved in amounts so that, by weight based upon the fat-containing milk substitute composition weight, the whey solids are in an amount of approximately from 5% to 9% and the skimmed milk solids are in an amount of approximately from 10% to 12% and wherein the fat is added so that, by weight based upon the fat-containing milk substitute composition weight, the fat is in an amount of approximately from 7% to 10%.

11. A process according to claim 10 further comprising also adding lecithin to the milk substitute composition to obtain the fat-containing milk substitute composition and wherein the lecithin is added so that, by weight based upon the fat-containing milk substitute composition weight, the lecithin is in an amount of approximately from 0.1% to 0.3%.

12. A process according to claim 1 further comprising dissolving lactose with the whey solids in the aqueous medium.

13. A process according to claim 12 further comprising adding a fat to the milk substitute composition to obtain a fat-containing milk substitute composition and wherein the aqueous medium is prepared to comprise the sequestering agent and carrageenate components in amounts so that, by weight based upon the fat-containing milk substitute composition weight, the sequestering agent and carrageenate components are in amounts, respectively, of approximately from 0.1% to 0.3% and of approximately from 0.01% to 0.03% and wherein the aqueous medium is in an amount and the whey solids and skimmed milk solids are dissolved in amounts so that, by weight based upon the fat-containing milk substitute composition weight, the whey solids are in an amount of approximately from 2.5% to 4.5% and the skimmed milk solids are in an amount of approximately from 10% to 12% and wherein the fat is added so that, by weight based upon the fat-containing milk substitute composition weight, the fat is in an amount of approximately from 7% to 10%.

14. A process according to claim 1 wherein the aqueous medium is prepared with soft water.

15. A process according to claim 1 wherein the sequestering agent is selected from the group consisting of a phosphate salt and a citrate salt.

16. a process according to claim 1 wherein the sequestering agent is selected from the group consisting of monosodium phosphate, disodium phosphate, trisodium phosphate, monosodium citrate, disodium citrate and trisodium citrate.

17. A process according to claim 1 wherein the whey solids powder is distributed from a powder distributor into the aqueous medium circulated through the powder distributor and to a vessel for dissolving the whey solids powder in the aqueous medium.

18. A process according to claim 1 wherein the whey solids powder is added to and stirred into the aqueous medium in a vat for dissolving the whey solids powder in the aqueous medium.

19. A process according to claim 1 wherein the skimmed milk powder is distributed from a powder distributor into the whey-containing medium circulated through the powder distributor and to a vat for dissolving the skimmed milk powder in the whey-containing medium.

20. A process according to claim 1 wherein the whey-containing medium is passed through a line and the skimmed milk powder is incorporated in-line into the whey containing medium in the line for dissolving the skimmed milk powder in the whey-containing medium.

21. A process according to claim 1 further comprising circulating water to a powder distributer and distributing carrageenate and sequestering agent from a powder distributor into water circulated through the powder distributor and to a vat for preparing the aqueous medium.

22. A process according to claim 1 further comprising dissolving a carrageenate in an amount of water and separately dissolving the sequestering agent in an amount of water to obtain two separate solutions and then combining and mixing the two solutions for preparing the aqueous medium.

* * * * *

UNITED STATES PATENT AND TRADEMARK OFFICE
CERTIFICATE OF CORRECTION

PATENT NO.    : 5,906,847
DATED         : May 25, 1999
INVENTOR(S)   : Hans ENGEL, *et al.*

It is certified that error appears in the above-indentified patent and that said Letters Patent is hereby corrected as shown below:

Column 1, line 36, after the period after "agent", insert -- Also according to the present invention, a portion of the whey employed may be substituted for by lactose, and in that case, the amount of whey is substituted, preferably, by lactose to an extent of approximately one-half --.

Signed and Sealed this

Sixteenth Day of November, 1999

Attest:

Q. TODD DICKINSON

*Attesting Officer*     *Acting Commissioner of Patents and Trademarks*